(12) United States Patent
Zöller

(10) Patent No.: US 7,942,126 B2
(45) Date of Patent: May 17, 2011

(54) METHOD FOR OPERATING AN INTERNAL COMBUSTION ENGINE AND INTERNAL COMBUSTION ENGINE FOR SUCH A METHOD

(75) Inventor: Herbert Zöller, Stuttgart (DE)

(73) Assignee: Daimler AG, Stuttgart (DE)

( * ) Notice: Subject to any disclaimer, the term of this patent is extended or adjusted under 35 U.S.C. 154(b) by 396 days.

(21) Appl. No.: 12/290,776

(22) Filed: Nov. 3, 2008

(65) Prior Publication Data

US 2009/0095251 A1    Apr. 16, 2009

Related U.S. Application Data

(63) Continuation-in-part of application No. PCT/EP2007/003791, filed on Apr. 28, 2007.

(30) Foreign Application Priority Data

May 4, 2006 (DE) .......................... 10 2006 020 642

(51) Int. Cl.
*F02B 3/08* (2006.01)
(52) U.S. Cl. ........................................ 123/298; 123/305
(58) Field of Classification Search .................. 123/298, 123/299, 305
See application file for complete search history.

(56) References Cited

U.S. PATENT DOCUMENTS

| 6,675,767 B2 * | 1/2004 | Gatellier et al. | 123/298 |
| 7,143,738 B2 * | 12/2006 | Ganz et al. | 123/295 |
| 7,753,025 B2 * | 7/2010 | Sasaki et al. | 123/298 |

FOREIGN PATENT DOCUMENTS

| CN | 2010070700518220 | 7/2010 |
| DE | 976 061 | 2/1963 |
| DE | 196 49 052 A1 | 5/1998 |
| EP | 0 528 166 A1 | 2/1993 |
| EP | 1 630 380 A1 | 3/2006 |
| EP | 1630 380 | 3/2006 |
| JP | 59079033 | 5/1984 |
| JP | 09228838 | 9/1987 |
| JP | 04228821 | 8/1992 |
| JP | 04272447 | 9/1992 |
| JP | 08296442 | 11/1996 |
| JP | 2004-190573 | 7/2004 |
| JP | 2004190573 | 7/2004 |

* cited by examiner

*Primary Examiner* — Erick Solis
(74) *Attorney, Agent, or Firm* — Klaus J. Bach

(57) ABSTRACT

In a method for operating a direct-injection auto-ignition internal combustion engine and a correspondingly configured internal combustion engine including a piston top having integrally formed therein a piston recess which merges into an essentially annular stepped space and an injector forming injection jets directed toward the stepped space, the jets are deflected there in such a way that a first part quantity of fuel is directed in an axial direction and a radial direction into the piston recess, a second part quantity of fuel is deflected in the axial direction and the radial direction over the piston top and third part quantities of fuel are deflected into a circumferential direction so as to impinge one onto the other in the circumferential direction and to be deflected radially inwardly, the start of injection and the injection duration being coordinated with one another and with the crank angle of the internal combustion engine in such a way that the third part quantities of adjacent injection jets meet each other in the circumferential direction with a velocity of at least 15 m/s.

20 Claims, 4 Drawing Sheets

METHOD FOR OPERATING AN INTERNAL COMBUSTION ENGINE AND INTERNAL COMBUSTION ENGINE FOR SUCH A METHOD

This is a Continuation-In-Part Application of pending International patent application PCT/EP2007/003791 filed Apr. 28, 2007 and claiming the priority of German patent application 10 2006 020 642.8 filed May 4, 2006.

BACKGROUND OF THE INVENTION

The invention relates to a method for operating a direct-injection auto-ignition internal combustion engine having a combustion chamber delimited by the cylinder, the cylinder head and the piston of the engine, the piston having a special recess toward which fuel is injected into the combustion chamber, and to an internal combustion engine operated by the method according to the invention.

DE 196 49 052 A1 discloses a diesel engine with direct fuel injection and with a piston recess. The direct-injection auto-ignition internal combustion engine shown there comprises at least one cylinder, a reciprocating piston disposed in the cylinder, a cylinder head and a combustion space delimited by the cylinder, the piston and the cylinder head. Integrally formed into the piston top is a piston recess which in the transitional region to the piston top merges into an essentially annular stepped space. A fuel injector is arranged in the cylinder head for injecting fuel into the combustion chamber. By means of the injector, a plurality of injection jets of fuel are injected, distributed over its circumference, into the combustion chamber along conically arranged jet axes.

The injection jet impinges onto the marginal region of the piston recess. As a result of this, the fuel jet is deflected essentially in two directions. A first part quantity passes downward into the combustion space recess with respect to the axial direction of the cylinder. A second part quantity is directed essentially radially over the piston head toward the cylinder wall. By means of the two part quantities, two combustion fronts, are formed. The second part quantity of fuel directed toward the cylinder wall is not optimal particularly with regard to the formation of soot and nitrogen oxide. The formation of an increased accumulation of soot in the engine oil has been observed.

It is the principal object of the present invention to provide a method for operating a direct-injection auto-ignition internal combustion engine with a reduced generation of soot and smoke. It is furthermore, an object of the present invention to provide a direct-injection auto-ignition internal combustion engine which is suitable for being operated by the method according to the invention.

SUMMARY OF THE INVENTION

In a method for operating a direct-injection auto-ignition internal combustion engine and a correspondingly configured internal combustion engine including a piston top having integrally formed therein a piston recess which merges into an essentially annular stepped space and an injector forming injection jets directed toward the stepped space, the jets are deflected there in such a way that a first part quantity of fuel is directed in an axial direction and a radial direction into the piston recess, a second part quantity of fuel is deflected in the axial direction and the radial direction over the piston top and third part quantities of fuel are deflected into a circumferential direction so as to impinge one onto the other in the circumferential direction and to be deflected radially inwardly, the start of injection and the injection duration being coordinated with one another and with the crank angle of the internal combustion engine in such a way that the third part quantities of adjacent injection jets meet each other in the circumferential direction with a velocity of at least 15 m/s.

The formation and guidance of the abovementioned third part quantities are achieved by the injection jets impinging onto the stepped space. As a result of the deflection toward the center of the piston recess, a third combustion front is formed. This is formed between adjacent injection jets and therefore exactly where there is still sufficient residual oxygen available for combustion. As a result of this, soot emission is reduced.

Since this third combustion front burns only with a time delay in relation to the other two combustion fronts, the local peak temperature in the combustion space and, consequently, the generation of nitrogen oxide are also reduced. The post-oxidation of soot is also promoted by this effect.

In so far as the internal combustion engine is operated with re-circulated exhaust gas for the reduction of nitrogen oxide, the twofold deflection of the fuel particles in the stepped space, that is to say a first deflection in the circumferential direction and subsequently a second radially inward deflection, achieves an additional intermixing effect which also intermixes the re-circulated, virtually inert exhaust gas with oxygen and fuel more effectively. The generation of local temperature peaks is reduced, with the result that the nitrogen oxide emission also decreases.

For an effective formation of the three combustion fronts, the jet cone angle, the start of injection and the injection duration must be coordinated with one another and with the crank angle of the internal combustion engine, in such a way that at least a considerable fraction of the fuel injection jets impinges onto the stepped space. This coordination is preferably carried out in such a way that at least 30%, in particular 30% to 80%, of the injected fuel quantity impinges onto the stepped space. The injection of the fuel expediently takes place with a pressure >1700 bar, preferably >2000 bar, and, in particular, about 2150 bar. For an effective formation of the third combustion front, a coordination has proved expedient in which the in each case third part quantities of adjacent injection jets in the circumferential direction impinge one on the other with a velocity of at least 15 m/s preferably about 30 m/s.

For effective formation and deflection of the third part quantities, a wall of the stepped space is preferably designed, in cross section, concavely as a segment of an arc of a circle or as a segment of an ellipse, with a radius which lies in a range of 3% to 30% of a radius of the piston recess.

Alternatively, it may also be expedient for the wall of the stepped space to be formed, in cross section, by a straight circumferential wall, a straight bottom and a concavely curved transitional wall, the circumferential wall being inclined with respect to an axial direction in a range of +10° to −30°, and/or the bottom being inclined with respect to a radial direction in a range of +30° to −40°, and/or the concavely curved transitional wall having a radius in a range of 1.5% inclusive to 20% inclusive of the radius of the piston recess.

A height of the stepped space in the axial direction preferably lies in a range of 10% to 30% of the radius of the piston recess, a width of the stepped space in the radial direction lying in a range of 2% to 30% of the radius of the piston recess.

For an effective deflection of the respective third part quantities of fuel out of the circumferential direction into the radial direction, deflection means are advantageously arranged in the stepped space on both sides of a point of impingement of the jet axis onto the stepped space. These deflection means promote an aerodynamically exact, low-loss guidance of the respective third part quantities of fuel.

The deflection means are expediently designed as deflecting noses projecting in the radial direction and the axial direction inward from the wall of the stepped space and in the direction of the piston recess or of the combustion space. These deflecting noses may be integrally formed in virtually any desired geometric shapes into the piston. Particularly in the case of formation in one piece by casting, a direction deflection adapted in a fluidly beneficial way can be implemented without additional outlay in manufacturing terms.

For this purpose, the stepped space merges concavely into the deflecting nose in the circumferential direction and the radial direction preferably in the form of an arc of a circle. The transition in the form of an arc of a circle expediently has a radius which lies in a range of 5% to 50% of the radius of the piston recess.

Alternatively, it may be advantageous that the stepped space merges in the circumferential direction and the radial direction into the deflecting nose in an elliptically concave manner. In this case, the elliptic transition preferably has a minor semi-axis and a major semi-axis, the minor semi-axis lying in a range of 2% to 25% of the radius of the piston recess, and the major semi-axis lying in a range of 10% to 60% of the radius of the piston recess. As a result of this, too, a fluidly beneficial deflection of the third fuel part quantity from the circumferential direction radially inward is achieved.

To assist the flow guidance, there is expediently provision for a height of the deflecting nose in the axial direction to lie in a range of 60% to 100% of the height of the stepped space, for a width of the deflecting nose in the radial direction to lie in a range of 60% to 100% of the width of the stepped space, and for an axial end face of the deflecting nose to be inclined inward into the piston recess at an angle in a range of 0° inclusive to 40° inclusive with respect to the radial direction.

For uniform formation of the three combustion fronts and good intermixing, the injector advantageously has on its circumference, particularly distributed uniformly, 7 to 12, preferably 8 to 10 injection holes. For the formation of accurately shaped injection jets and uniform impingement onto the stepped space, the respective injection holes of the injector have a length and a diameter, the ratio of the length to the diameter lying in a range of 3.0 to 11.0. All the jet axes of injection jets are in this case expediently arranged on a single common cone envelope.

An exemplary embodiment of the invention is described in more detail below with reference to the accompanying drawings:

DESCRIPTION OF PARTICULAR EMBODIMENTS

Figure 1:
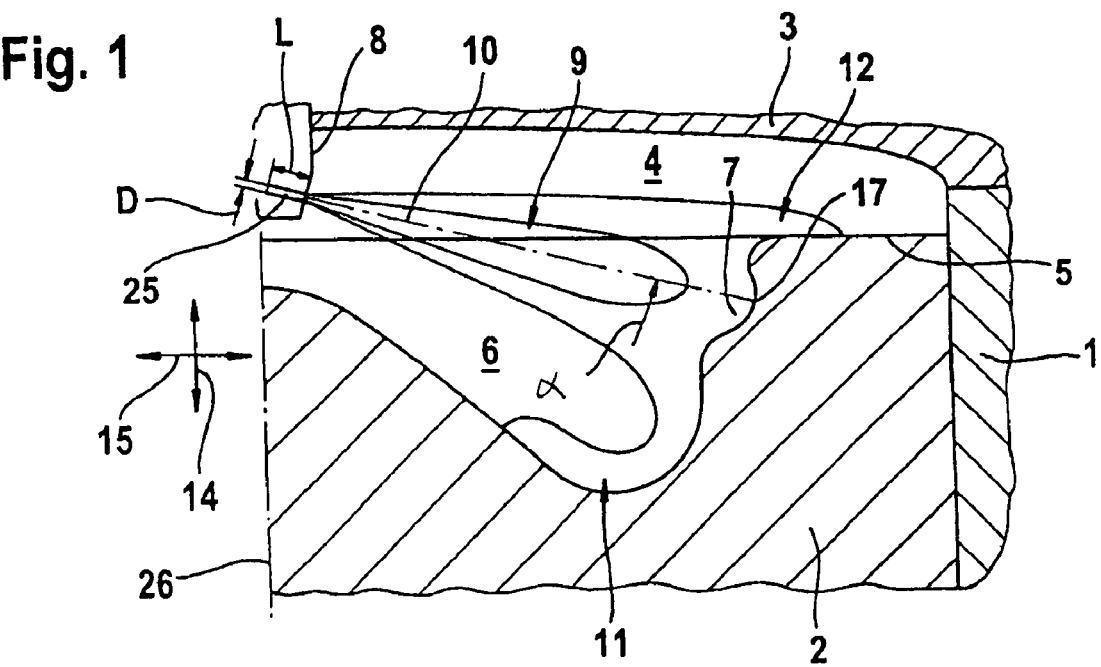
FIG. 1 shows a diagrammatic longitudinal sectional illustration of the cylinder of an internal combustion engine according to the invention, with a piston disposed in a cylinder having a cylinder head and with a combustion space and also with details of the formation of an injection jet divided into part quantities.

FIG. 1 shows a diagrammatic longitudinal sectional illustration of a direct-injection auto-ignition internal combustion engine designed according to the invention in the region of a cylinder 1 in which a piston 2 is moved up and down. Only one cylinder 1 is shown by way of example. The internal combustion engine may have any desired number of correspondingly configured cylinders 1, in each of which the method according to the invention, described below, is implemented.

A merely indicated cylinder head 3 delimits, together with the cylinder 1 and the piston 2, a combustion space 4. A merely indicated injector for the injection of liquid fuel, in particular diesel fuel, is arranged in the cylinder head 3.

The piston 2 has, on its side facing the combustion space 4, a piston top 5 into which a piston recess 6 is formed. The piston recess 6 merges on the outside, in a radial direction 15, into an essentially annular stepped space 7 in the transitional region to the piston top 5. The arrangement shown is set up, overall, rotationally symmetrically with respect to a cylinder axis 26, the cylinder axis 26 predetermining an axial direction 14. The radial direction 15 extends perpendicularly to the axial direction 14.

The injector has, distributed uniformly over its circumference, fuel injection openings 25, of which only one injection opening 25 is illustrated here for the sake of greater clarity. The injection openings 25 of the injector 8 have a length L and diameter D, the ratio of the length L to the diameter D being in a range of 3.0 to 11.0. A center axis of the injection openings 25 is inclined obliquely downward toward the piston 2 with respect to the radial direction 15. The injection of fuel through the injection openings 25 forms in each case an injection jet 9, indicated diagrammatically, the jet axes 10 of the jets being arranged conically. It may be expedient to provide different cone angles α for the various jet axes 10. In the exemplary embodiment shown, all the jet axes 10 of the injection jets 9 lie on a single common cone envelope having a constant cone angle α.

Depending on the crank angle, the piston 2 assumes in the axial direction 14 various positions in relation to the cylinder head 3 or to the injector 8 and its jet axes 10. The cone angle α of the conically arranged jet axes 10, the start of injection and the injection duration are coordinated with one another or with the crank angle and consequently with the axial position of the piston 2 in such a way that the jet axes 10 are directed, at least over a significant part of the fuel injection period, onto the stepped base 7. They impinge onto the stepped space 7 at an impingement point 17. The abovementioned coordination is selected in such a way that at least 30%, in particular 30% to 80% of the injected fuel quantity of the injection jets 9 impinges onto the stepped space 7.

The configuration of the stepped space described in more detail further below, in conjunction with the abovementioned coordination, has the effect of dividing and deflecting the injection jets 9 into first part quantities 11, second part quantities 12 and third part quantities 13 shown in FIG. 7 to 10. The first part quantity 11 of fuel is deflected in the axial direction 14 and the radial direction 15 away from the cylinder head 3 downward into the piston recess 6 and there in the radial direction 15 inward toward the cylinder axis 26. The second part quantity 12 of fuel is deflected partially in the radial direction 15 outward over the piston head 5 and out of the stepped space 7 in the axial direction 14 upward to the cylinder head 3 and in the radial direction 15 outward over the piston head 5 into the combustion space 4 toward the wall of the cylinder 1. Further details of fuel guidance are described more specifically further below in conjunction with FIG. 7 to 10.

Figure 2:
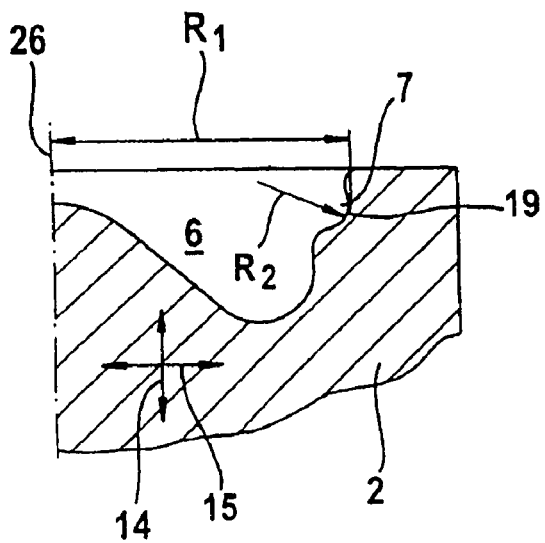
FIG. 2 shows a detail of the piston according to FIG. 1 indicating of the geometric design of its stepped space having a cross section in the form of a segment of a circle.

FIG. 2 shows a detail of the piston 2 according to FIG. 1 in the region of the piston recess 6 and of the stepped space 7. The stepped space 7 is delimited outward in the radial direction 15 and downward in the axial direction 14, pointing away from the piston head 5, by a rounded wall area 19. The wall area 19 of the stepped space 7 is designed, in cross section, concavely as a segment of an arc of a circle. A radius $R_2$ of the segment of an arc of a circle lies in the range of 3% to 30% of a radius $R_1$ of the piston recess 6. The radius $R_1$ of the piston recess 6 is measured from the cylinder axis 26 and comprises the entire piston recess 6, including the stepped space 7.

In the exemplary embodiment shown, a constant radius $R_2$ is provided. An elliptic version may also be expedient, the large and small radii of which expediently lie in the range specified above.

Figure 3:
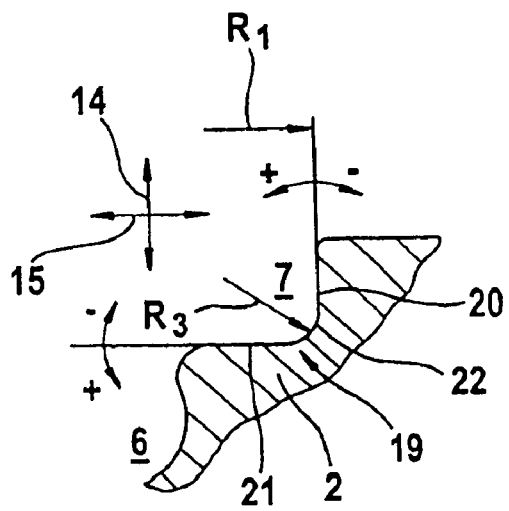
FIG. 3 shows a variant of the stepped space having an angled cross section.

FIG. 3 shows an alternative embodiment of the stepped space 7 according to FIG. 2. Accordingly, the cross section of the stepped space 7 is of angular design. The wall 19 of the stepped space 7 is formed by a cylindrical circumferential wall 20 section extending straight in the axial direction 14, by a planar bottom area 21 extending straight in the radial direction 15 and joining the cylindrical wall section via a concavely curved transitional wall section 22. The bottom area 21 merges by means of the transitional wall section 22 into the circumferential wall 20. The concavely curved transitional wall section 22 has a radius $R_3$ which lies in a range of 1.5% to 20% of the radius $R_1$ of the piston recess 6.

In the exemplary embodiment shown, the circumferential wall section 20 extends parallel to the axial direction 14, while the bottom 21 extends parallel to the radial direction 15. Double arrows given a + and a − indicate that it may also be expedient to provide an inclination for the circumferential wall section 20 and/or the bottom area 21. The circumferential wall section 20 is in this case advantageously inclined with respect to the axial direction 14 in a range of +10° to −30°. The bottom area 21 is expediently inclined with respect to the radial direction 15 in a range of +30° to −40°.

Figure 4:
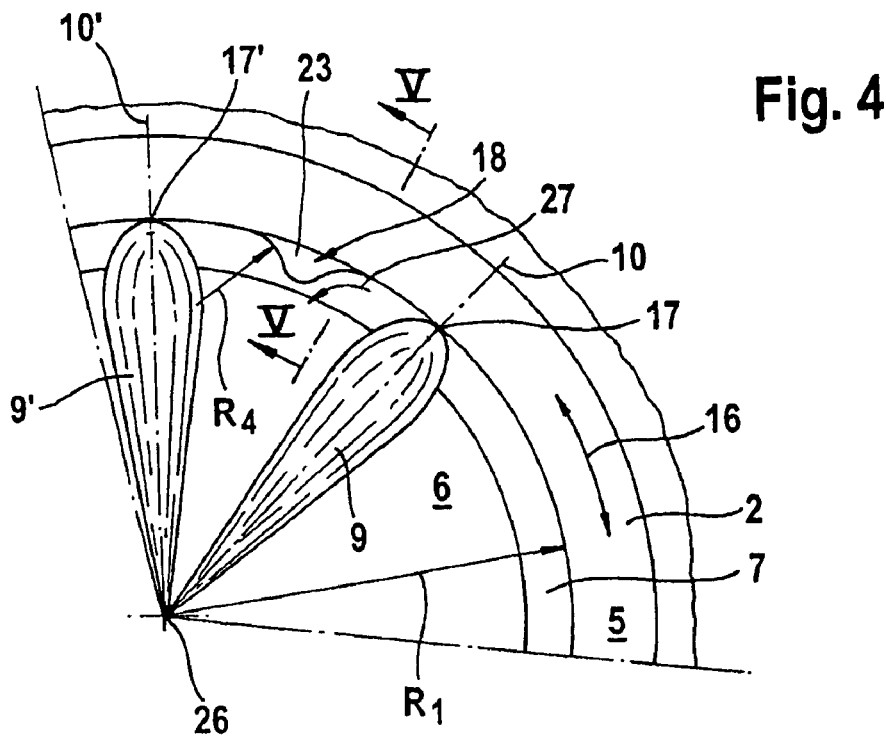
FIG. 4 shows, in the form of a detail, a top view of the piston according to FIG. 1 with integrally formed deflecting noses.

FIG. 4 shows, in the form of a detail, a top view of the piston 2 according to FIG. 1. In this top view, it can be seen that the piston recess 6, the stepped space 7 and the piston head 5 are arranged approximately circularly coaxially with the cylinder axis 26. A circumferential direction is indicated by a double arrow 16 with respect to the cylinder axis 26.

Of the multiplicity of injection jets 9 provided, for the sake of greater clarity only two adjacent injection jets 9, 9' are illustrated, the jet axes 10, 10' of which impinge onto the stepped space 7 at impingement points 17, 17'. Arranged in the stepped space 7 in the circumferential direction 16, centrally between the impingement points 17, 17', are deflection means 18, the function of which is described in more detail further below in conjunction with FIG. 8 to 10. In the exemplary embodiment shown, the deflection means 18 are designed as deflecting noses 23 projecting in the radial direction 15 inward from the wall of the stepped space 7 and into the piston recess 6. For the sake of greater clarity, only one deflecting nose 23 is illustrated here. A deflecting nose 23 is in each case arranged centrally in the interspace between each impingement point 17, 17' of all the injection jets 9, 9', and therefore a deflecting nose 23 is disposed at each of the two sides of each impingement point 17, 17'. The number of deflecting noses 23 consequently corresponds to the number of injection jets 9, 9'.

The wall of the stepped space 7 merges in the form of an arc of a circle concavely into the deflecting nose 23 with respect to the plane of the circumferential direction 16 and of the radial direction 15. The transition in the form of an arc of a circle is provided with a radius $R_4$ in the plane spanned by the radial direction 15 and the circumferential direction 16. The radius $R_4$ of the transition in the form of an arc of a circle lies in a range of 5% to 50% of the radius $R_1$ of the piston recess 6.

Figure 5:
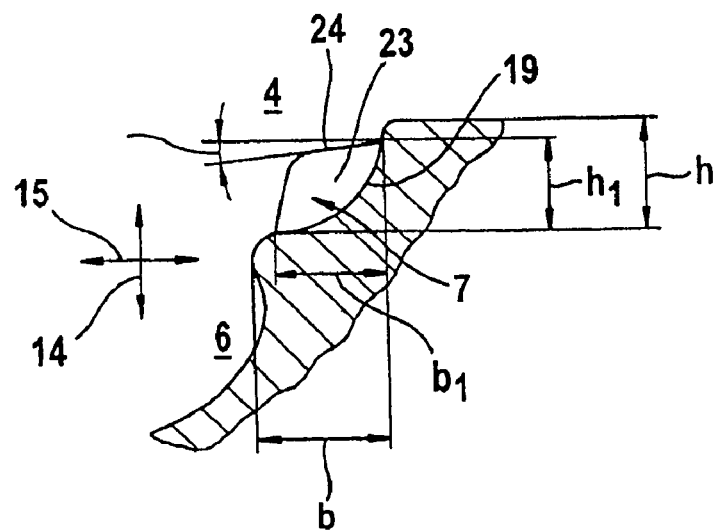
FIG. 5 shows a detail of the piston according to FIG. 4 in a cross section indicated there along the line V-V of FIG. 4, with details of the geometric design of the stepped space and of the deflecting nose.

FIG. 5 shows a cross-sectional illustration of the arrangement according to FIG. 4 along the sectional line indicated there by arrows V-V. Accordingly, the deflecting nose 23 projects inward in the radial direction 15 and upward in the axial direction 14 beyond the wall area 19 of the stepped space 7 and projects into the piston recess 6 or in the direction of the combustion space 4.

A height h of the stepped space 7, as measured in the axial direction 14, lies in a range of 10% to 30% of the radius $R_1$ of the piston recess 6 (FIG. 4). A width b of the stepped space 7, as measured in the radial direction 15, lies in a range of 2% to 30% of the radius $R_1$ of the piston recess 6 (FIG. 4).

A height $h_1$ of the deflecting nose 23, as measured in the axial direction 14, lies in a range of 60% to 100% of the height h of the stepped space 7. A width $b_1$ of the deflecting nose 23, as measured in the radial direction 15, lies in a range of 60% to 100% of the width b of the stepped space 7. The deflecting nose 23 is delimited with respect to the axial direction 14 in the direction of the combustion space 4 by an axial end face 24. The end face 24 of the deflecting nose 23 is inclined at an angle β with respect to the radial direction 15 inward into the piston recess 6 away from the cylinder head 3. The angle β of the end face 24 in this case preferably lies in a range of 0° to 40° with respect to the radial direction 15.

Figure 6:
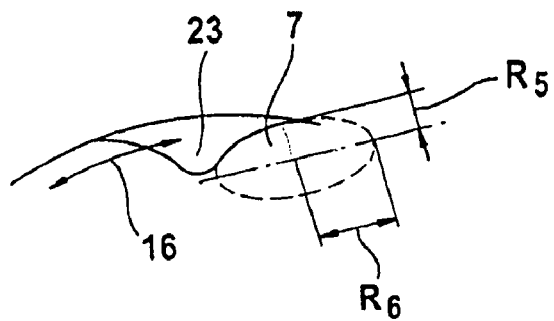
FIG. 6 shows a variant of the deflecting nose according to FIGS. 4 and 5 with an elliptically concave rounding.

FIG. 6 shows another variant of the deflecting nose 23 according to FIG. 4, in which the stepped space 7 merges in the circumferential direction 16 into the deflecting nose 23 in an elliptically concave manner. The elliptic transition has a minor semi-axis $R_5$ and a major semi-axis $R_6$, the minor semi-axis $R_5$ lying in a range of 2%.

Figure 7:
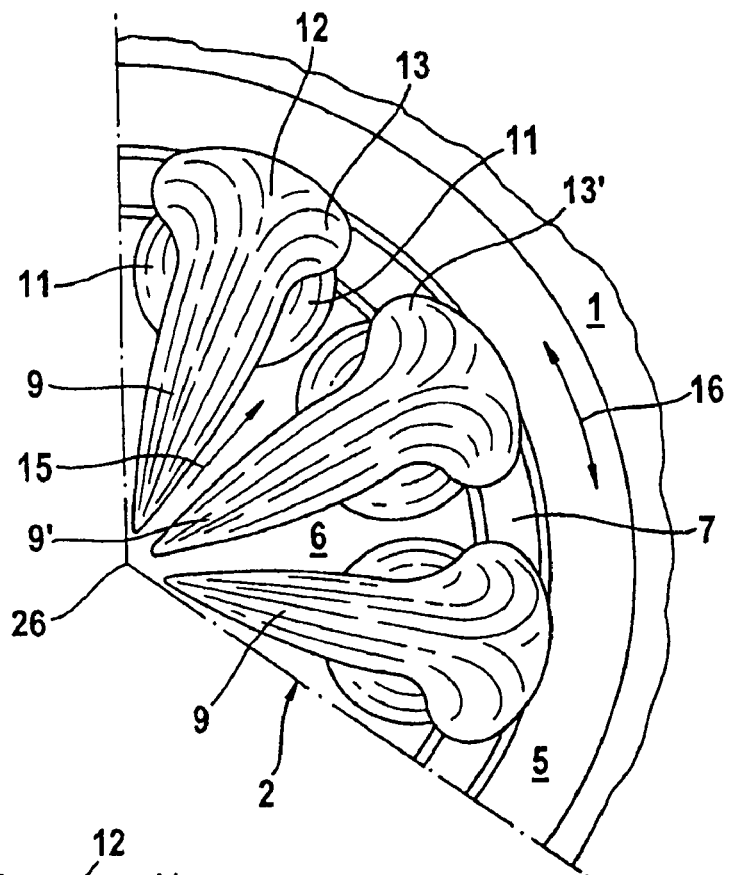
FIG. 7 shows a detail, a top view of a piston with, depicted on it, propagation profiles of injection jets after the start of injection.
Figure 8:
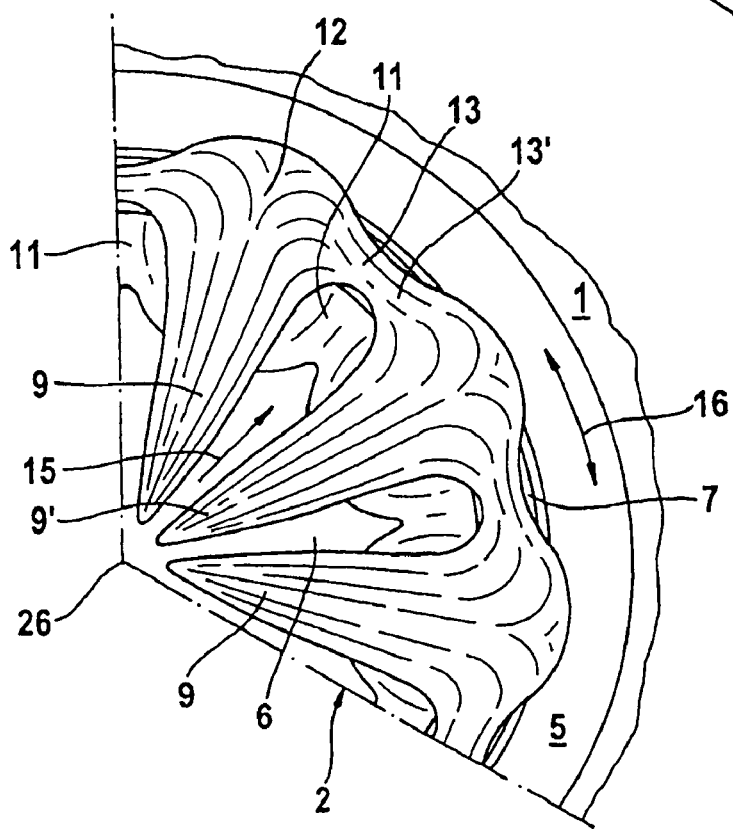
FIG. 8 shows the arrangement according to FIG. 7 after further advanced fuel injection with third fuel part quantities which have impinged one onto the other in the circumferential direction.
Figure 9:
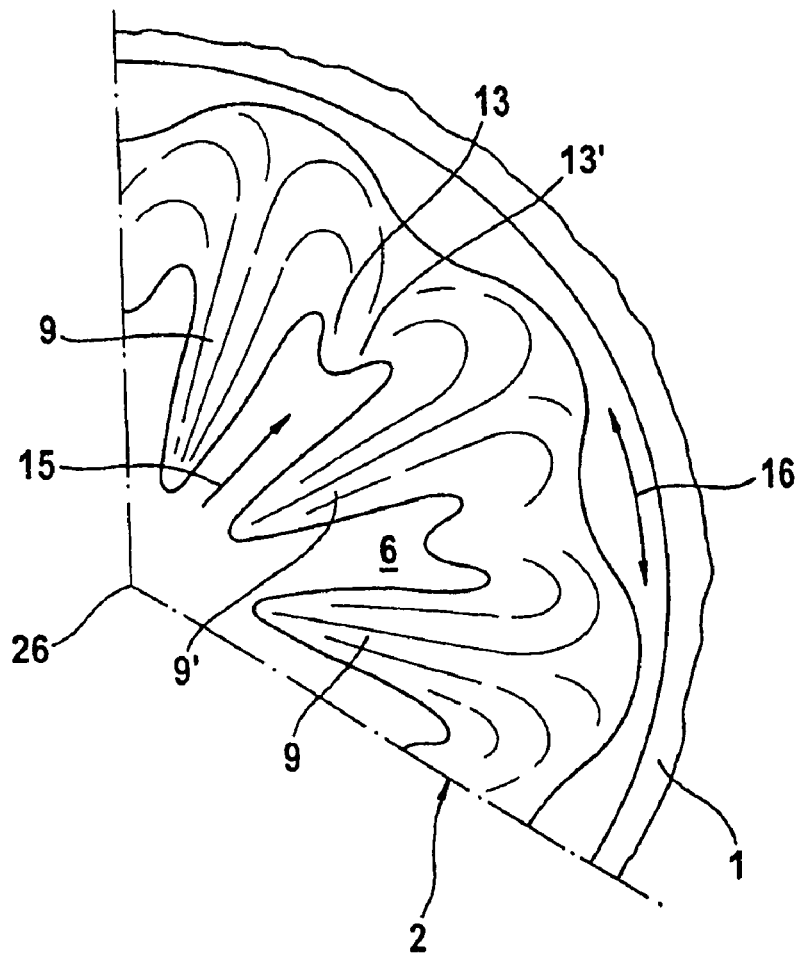
FIG. 9 shows a further phase image of fuel propagation according to FIGS. 7 and 8 with third part quantities of fuel deflected radially inward.

FIG. 7 to 9 show, in the form of a detail, the cylinder 1 with the piston 2 disposed in it, in various time phases of the operating method according to the invention. One third of the cylinder 1 with a piston 2 is shown in each case in the circumferential direction 16. The injector 8 (FIG. 1) has, distributed uniformly over its circumference, seven to twelve, preferably eight to ten injection openings 25. In the exemplary embodiment shown, nine injection openings 25 (FIG. 1) are provided, accordingly three injection jets 9, 9' of injected diesel fuel being formed in the third of a cross-section shown in FIG. 7 to 8.

FIG. 7 shows the state of fuel injection or of the formation of the injection jets 9, 9' at about a 20° crank angle after the start of injection. Accordingly, at this point in time, the injection jets 9, 9' have already impinged onto the stepped space 7 and are divided into three part quantities 11, 12, 13. The first part quantity 11 of fuel is deflected, in a radial direction 15, back to the cylinder axis 16 and at the same time downward into the piston recess 6. Its propagation in this case takes place beneath the injection jets 9, 9' (in terms of the view according to FIG. 7 to 9), opposite to their injection direction, in the radial direction 15. The second part quantity 12 of fuel is deflected in the radial direction 15 out of the stepped space 7, over the piston head 5, radially outwardly.

Furthermore, the impingement of injection jets 9, 9' onto the stepped space 7 has the effect that a third part quantity 13 is formed by the fuel of the respective injection jets 9, 9'. These third part quantities 13, 13' are deflected out of the radial direction 15 of the injection jets 9, 9' on both sides into the circumferential direction 16 when they impinge onto the stepped space 7, so that the in each case third part quantities 13, 13' of adjacent injection jets 9, 9' move toward one another. At their meeting point, the deflection means 18 or the deflecting noses 23 (FIG. 4 to 6) are arranged, which are not illustrated in FIG. 7 to 10 for the sake of greater clarity. Moreover, it may even be expedient to omit the deflection means 18 or the deflecting noses 23 (FIG. 4 to 6).

FIG. 8 shows, as a subsequent phase image, the arrangement according to FIG. 7 at about a 25° crank angle after the start of injection. The formation and deflection of the third part quantity 13, 13' into the circumferential direction 16 has led to a situation where the in each case third part quantities 13, 13' of adjacent injection jets 9, 9' have impinged one onto the other in the circumferential direction 16. In so far as deflection means 18 or deflecting noses 23 (FIG. 4 to 6) are provided, the adjacent part quantities 13, 13' meet at the location of the noses 23.

The injection of the liquid fuel in order to form the injection jets 9, 9' takes place with a pressure >1700 bar, preferably >2000 bar, and, in the exemplary embodiment shown, is carried out, in particular, at about 2150 bar. In conjunction with the geometric design of the injection openings 25 (FIG. 1) and the mutual coordination of the cone angle α (FIG. 1), start of injection, injection duration and geometric design of the piston recess 6 and of the stepped space 7, in each case the third part quantities 13, 13' of the adjacent injection jets 9, 9' impinge one onto the other in the circumferential direction 16 with a velocity of at least 15 m/s, here preferably of about 30 m/s.

In the further phase image according to FIG. 9, the propagation of the injected fuel is illustrated at about a 34° crank angle after start of injection. The part quantities 13, 13' of adjacent injection jets 9, 9' which are impinged one onto the other are deflected, in relation to the phase image according to FIG. 8, out of their direction of movement in the circumferential direction 16, back in the radial direction 15 inward toward the cylinder axis 26. This deflection is caused by the stepped space 7 (FIG. 1 to 8), if appropriate with the assistance of the deflection means 18 or deflecting noses 23 (FIG. 4 to 6).

Figure 10:
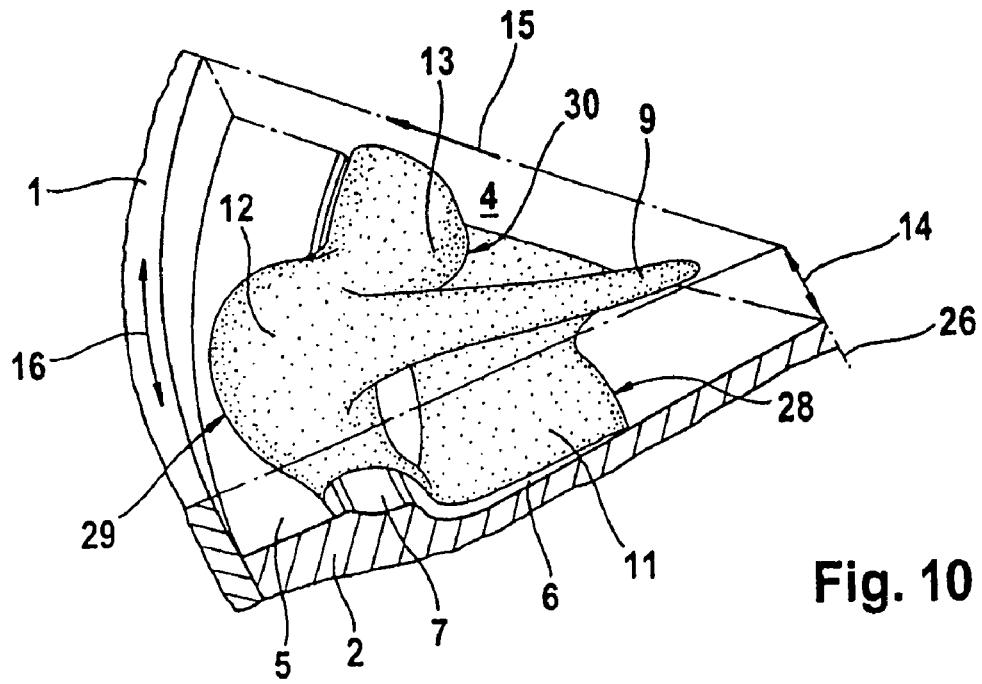
FIG. 10 is a perspective view of the fuel distribution according to FIG. 9 with details of the formation of three combustion fronts.

Finally, FIG. 10 shows a perspective illustration of a detail of the cylinder 1 with the piston 2 in the region of an individual injection jet 9 at a point in time after FIG. 9. Accordingly, after the impinging onto the stepped space 7, the injection jet 9 directed outward in the radial direction 15 onto the stepped space 7 is divided into three part quantities 11, 12, 13. With respect to their propagation direction described in more detail earlier, overall three different combustion fronts 28, 29, 30 are formed on their respective front sides. In particular, the third part quantity 13, propagated opposite to the radial direction 15, and the third combustion front 30, accompanying said part quantity, have been formed, in time, only after the first part quantity 11 and the second part quantity 12 together with the associated combustion fronts 28, 29. The third combustion front 30 is established, with respect to the circumferential direction 16, between adjacent injection jets 9, 9' (FIG. 7 to 9) and with respect to the axial direction 14 above the piston recess 6 which receives the first part quantity 11 with the first combustion front 28. There is still sufficient residual oxygen available there for combustion. As a result of this, soot emission is reduced. By the third combustion front 30 occurring with a time delay, the formation of local peak temperatures in the combustion space 4 is also avoided or reduced. This contributes to reducing the generation of nitrogen oxide. The post-oxidation of soot is also promoted. The second part quantity 12, by being deflected into the axial direction 14, is markedly braked in its propagation toward the cylinder wall (radial direction 15), as compared with conventional methods. At a 34° crank angle after top dead center (FIG. 9), the fuel particles still have no wall contact and reach the wall of the cylinder 1 only at about a 36° crank angle. As a result also, the introduction of soot into the engine oil at the wall of the cylinder 1 is reduced.

For greater clarity, in FIGS. 7 to 10, functionally identical features which are not specifically referred to in detail above in each case in connection with a particular fig. are given the same reference symbols.

What is claimed is:

1. A method for operating a direct-injection auto-ignition internal combustion engine, the internal combustion engine comprising at least one cylinder (1), a reciprocating piston (2) disposed in the cylinder (1), a cylinder head (3) and a combustion space (4) delimited by the cylinder (1), the piston (2) and the cylinder head (3), the piston (2) having a piston top (5) including a piston recess (6) which, has a transitional region with an essentially annular stepped space (7), and an injector (8) for injecting fuel into the combustion space (4), the injector (8) having a plurality of injection openings (25) forming jets (9, 9') of fuel which are injected, distributed over the circumference of said combustion space (4), into the combustion space (4) along conically arranged jet axes (10), said method comprising the steps of: directing the injection jets (9, 9') toward the stepped space (7) so that they are deflected there in such a way that a first part quantity (11) of fuel is deflected in an axial direction (14) and a radial direction (15) into the piston recess (6), a second part quantity (12) of fuel is deflected in the axial direction (14) and the radial direction (15) over the piston top (5) into the combustion space (4), and third part quantities (13, 13') of fuel are deflected into a circumferential direction (16), the third part quantities (13, 13') of adjacent fuel jets (9, 9') impinging one onto the other in the circumferential direction (16) and subsequently being deflected radially inwardly, the jet cone angle, the start of injection and the injection duration being coordinated with one another and with the crank angle of the internal combustion engine in such a way that the third part quantities (13, 13') of adjacent injection jets impinge one onto the other in the circumferential direction (16) with a velocity of at least 15 m/s.

2. The method as claimed in claim 1, wherein a cone angle (α) of the conically arranged jet axes (10), the start of injection and the injection duration are coordinated with one another in such a way that at least 30%, 30% to 80% of the injected fuel quantity impinges onto the stepped space (7).

3. The method as claimed in claim 1, wherein deflection means (18) provided in the stepped space (7) on both sides of a point of impingement (17) of the jet axis (10) onto the stepped space (7), deflect the third part quantity (13) of fuel from the circumferential direction (16) radially inwardly.

4. The method as claimed in claim 1, wherein the fuel is injected into the combustion space (4) with a pressure at least 1700 bar.

5. The method as claimed in claim 4, wherein the fuel is injected at a pressure of 2150 bar.

6. An internal combustion engine for performing a method as defined in claim 1, the internal combustion engine being a direct-injection auto-ignition internal combustion engine with at least one cylinder (1), with a reciprocating piston (2) disposed in the cylinder (1), and a cylinder head (3) with a combustion space (4) being delimited by the cylinder (1), the piston (2) and the cylinder head (3), the piston (2) having a piston top (5) with a piston recess (6) which, in the transitional region to the piston head (5), merges into an essentially annular stepped space (7), and an injector (8) centrally arranged in the cylinder head (3) for injecting fuel into the combustion space (4), said injector having a plurality of fuel discharge openings (25) for the injection of a plurality of injection jets (9, 9') of fuel, distributed over the circumference of said combustion space, into the combustion space (4) along conically arranged jet axes (10), and the jet axes (10) of said injector being directed, at least in part of the period of time of injection, onto the stepped space (7).

7. The internal combustion engine as claimed in claim 6 wherein the stepped space (7) includes a wall (19) extending, in cross section, concavely as a segment of an arc of a circle or as a segment of an ellipse with a radius ($R_2$) in a range of 3% to 30% of a radius ($R_1$) of the piston recess (6).

8. The internal combustion engine as claimed in claim 7, wherein the wall (19) of the stepped space (7) is formed, in cross section, by a circumferential wall section (20), a bottom section (21) and a concavely curved transitional wall section (22), the circumferential wall (20) being inclined with respect to an axial direction (14) in a range of +10° to −30°, the bottom section (21) being inclined with respect to a radial direction (15) in a range of +30° to −40°, and the concavely curved transitional wall section (22) having a radius ($R_3$) in a range of 1.5% to 20% of the radius ($R_1$) of the piston recess (6).

9. The internal combustion engine as claimed in 6, wherein of the stepped space (7) has a height (h) in the axial direction (14) in a range of 10% to 30% of the radius ($R_1$) of the piston recess (6), and a width (b) in the radial direction (15) in a range of 2% to 30% of the radius ($R_1$) of the piston recess (6).

10. The internal combustion engine as claimed in claim 6, wherein, on both sides of a point of impingement (17) of the jet axis (10) onto the stepped space (7), deflection means (18) are arranged in the stepped space (7), for deflecting a third part quantity (13) of fuel from a circumferential direction (16) radially inwardly.

11. The internal combustion engine as claimed in claim 10, wherein the deflection means (18) are in the form of deflecting noses (23) projecting in the radial direction (15) and the axial direction (14) inwardly from the wall (19) of the stepped space (7) toward the piston recess (6) or of the combustion space (4).

12. The internal combustion engine as claimed in claim 11, wherein the stepped space (7) merges in the circumferential direction (16) and the radial direction (15) into the deflecting nose (23) concavely in the form of an arc of a circle.

13. The internal combustion engine as claimed in claim 12, wherein the transition in the form of an arc of a circle has a radius ($R_4$) in a range of 5% to 50% of the radius ($R_1$) of the piston recess (6).

14. The internal combustion engine as claimed in claim 13, wherein the stepped space (7) merges in the circumferential direction (16) and the radial direction (15) into the deflecting nose (23) in an elliptically concave manner.

15. The internal combustion engine as claimed in claim 14, wherein the elliptic transition has a minor semi-axis ($R_5$) and a major semi-axis ($R_6$), the minor semi-axis ($R_5$) lying in a range of 2% to 25% of the radius ($R_1$) of the piston recess (6), and the major semi-axis ($R_6$) lying in a range of 10% to 60% of the radius ($R_1$) of the piston recess (6).

16. The internal combustion engine as claimed in claim 11, wherein the deflecting nose (23) has a height ($h_1$) in the axial direction (14) in a range of 60% to 100% of the height (h) of the stepped space (7), a width ($b_1$) of the deflecting nose (23) in the radial direction (15) in a range of 60% to 100% of the width (b) of the stepped space (7), and an axial end face (24) of the deflecting nose (23) being inclined inwardly into the piston recess (6) at an angle in a range of 0° to 40° with respect to the radial direction (15).

17. The internal combustion engine as claimed in claim 6, wherein the injector (8) has, uniformly distributed over its circumference, seven to twelve injection openings (25).

18. The internal combustion engine as claimed in claim 17, wherein the injector has eight to ten injection openings (25).

19. The internal combustion engine as claimed in claim 6, wherein each injection opening (25) of the injector (8) has a length (L) and a diameter (D), the ratio of the length (L) to the diameter (D) being in a range of 3.0 to 11.0.

20. The internal combustion engine as claimed in claim 6, wherein all the jet axes (10) of the injection jets (9) are arranged on a single common cone envelope.

* * * * *